(12) United States Patent
Shibano

(10) Patent No.: US 7,110,848 B2
(45) Date of Patent: Sep. 19, 2006

(54) COMPUTER PROGRAM PRODUCT

(76) Inventor: Ryozo Shibano, 4-19-3, Wakinoshima-cho, Tajimi-shi, Gifu (JP) 507-0826

( * ) Notice: Subject to any disclaimer, the term of this patent is extended or adjusted under 35 U.S.C. 154(b) by 0 days.

(21) Appl. No.: 10/513,045

(22) PCT Filed: Jun. 24, 2002

(86) PCT No.: PCT/JP02/06276

§ 371 (c)(1),
(2), (4) Date: Nov. 1, 2004

(87) PCT Pub. No.: WO04/001514

PCT Pub. Date: Dec. 31, 2003

(65) Prior Publication Data

US 2005/0228534 A1    Oct. 13, 2005

(51) Int. Cl.
G06F 19/00 (2006.01)
(52) U.S. Cl. .................... 700/148; 700/98; 700/182
(58) Field of Classification Search .................. 700/98, 700/148, 182
See application file for complete search history.

(56) References Cited

U.S. PATENT DOCUMENTS 6,338,000 B1    1/2002    Nakajima et al.

FOREIGN PATENT DOCUMENTS

| JP | 01-181925 A | 7/1989 |
|---|---|---|
| JP | 06-292930 A | 10/1994 |
| JP | 07-9403 A | 1/1995 |

OTHER PUBLICATIONS

S. H. Masood, A. Lau, A CAD/CAM system for the machining of precision cams using a half angle search algorithm, The International Journal of Advanced Manufacturing Technology, vol. 14, Issue 3, Mar. 1998, pp. 180-184.*
"Survey of CAD/feature-based process planning and NC programming techniques" -Shah et al, Arizona State University, Computer Aided Engineering Journal, Feb. 1991.*
"Opportunities for Research on Numerical Control Machining" -Grossman et al, Communications of the ACM, Jun. 1986.*
"Integration of CAD, CAM, and NC with Step-NC" -Saaski et al, VTT Industrial Systems, VTT 2005.*
International Search Report dated Oct. 1, 2002.
English Translation of the International Preliminary Examination Report.
European Search Report, Ref. KZ 9-19575.5.

* cited by examiner

Primary Examiner—Leo Picard
Assistant Examiner—Michael D. Masinick
(74) Attorney, Agent, or Firm—Rader, Fishman & Grauer PLLC

(57) ABSTRACT

The objective of the present invention is to implement highly accurate general automatic tool assignment with a sheet metal CAD/CAM system. Once CAD drawings are generated (S102), continuous line processing, product outer lines, window cut-out lines and the like are defined (S103) and then assigned tools (S210 through S286).

Automatic tool assignment is finished with precedence for priority processing shapes such as simple shapes (arcs, triangles and the like) and shapes that can be punched out using a special tool (S210). A general automatic tool assignment process is then performed. With this process, tools are assigned by dividing each of arcs and oblique lines, which forms a processing shape unit, into shapes to which horizontally/vertically orthogonal lines are added (S250), converting the remaining shapes to rectangles, and assigning a tool to each of those rectangles (S280).

Once a non-executable NC program is generated through such tool assignment (S112), the NC program is optimized (S114), and an executable NC program is then output (S116).

4 Claims, 18 Drawing Sheets

FIG.3
(a) 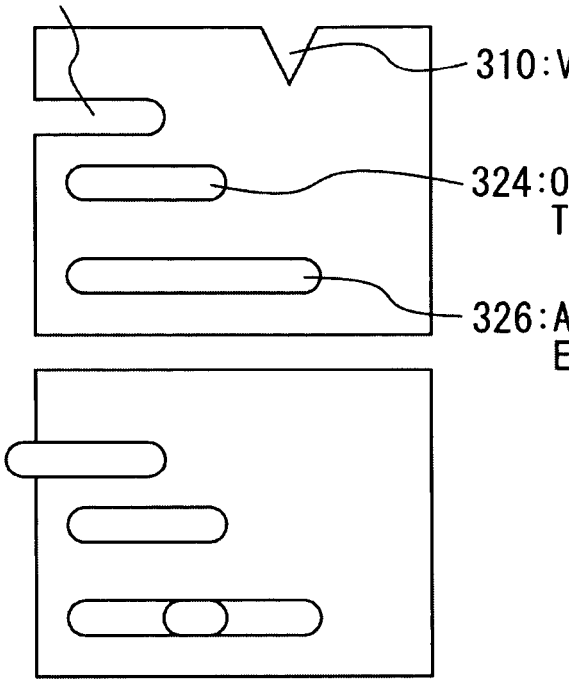
ELONGATED TOOL ASSIGNMENT
(b) 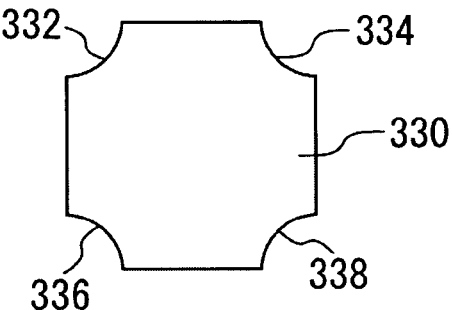
(c) 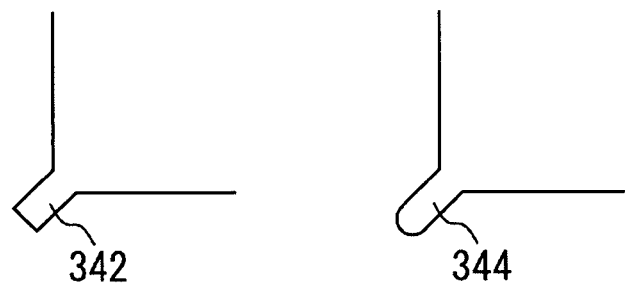
(d) 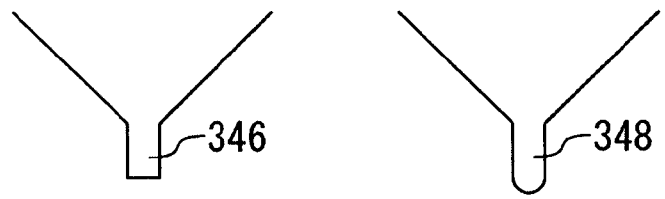

CONTINUOUS LINE REPRESENTATION SHAPES

| POINT | SHAPE NUMBER | INNER SHAPE NUMBER | OUTER LINE / WINDOW CUT-OUT CATEGORY | POINT TYPE | ANGLE | X COORDI-NATE | Y COORDI-NATE |
|---|---|---|---|---|---|---|---|
| $P_1$ | 00001 | 0010 | OUTER | LINE | 90 | $X_1$ | $Y_1$ |
| $P_2$ | 00001 | 0020 | OUTER | LINE | 100.174 | $X_2$ | $Y_2$ |
| $P_3$ | 00001 | 0030 | OUTER | ARC | 135.27 | $X_3$ | $Y_3$ |
| $P_4$ | 00001 | 0040 | OUTER | LINE | 169.826 | $X_4$ | $Y_4$ |

FIG.7
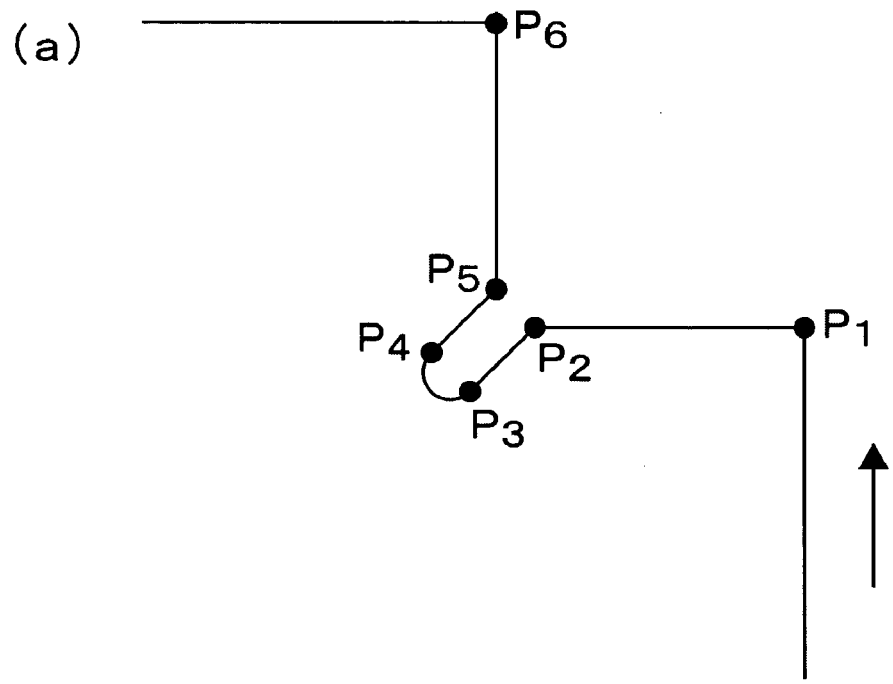
(a)
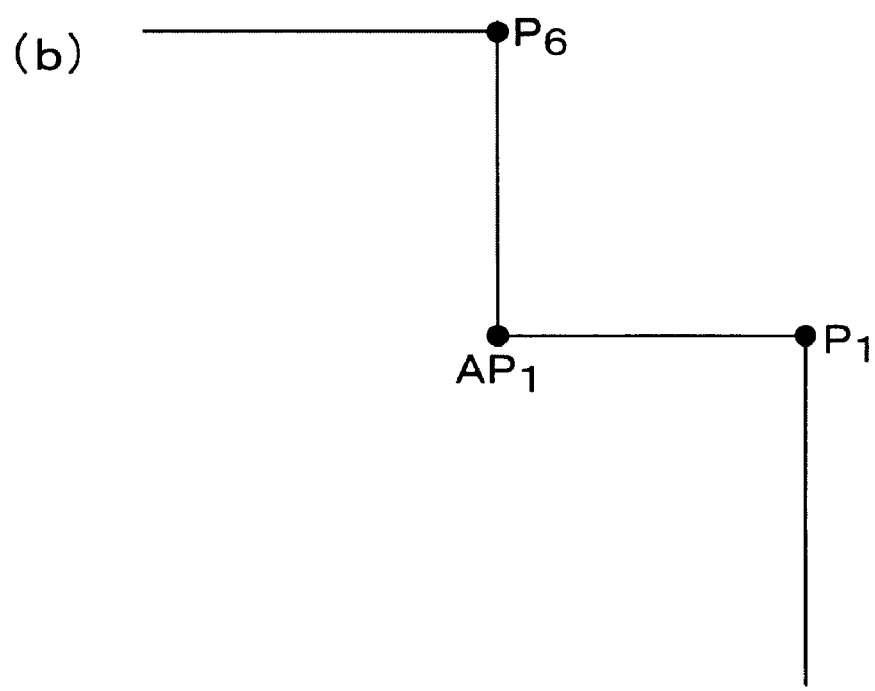
(b)

FIG.8

(a) CONTINUOUS LINE FILE

| POINT | OUTER LINE / WINDOW CUT-OUT CATEGORY | POINT TYPE | ANGLE | X COORDI-NATE | Y COORDI-NATE |
|---|---|---|---|---|---|
| $P_1$ | OUTER | LINE | 90 | $X_1$ | $Y_1$ |
| $P_2$ | OUTER | LINE | 45 | $X_2$ | $Y_2$ |
| $P_3$ | OUTER | ARC | -180 | $X_3$ | $Y_3$ |
| $P_4$ | OUTER | LINE | -180 | $X_4$ | $Y_4$ |
| $P_5$ | OUTER | LINE | 45 | $X_5$ | $Y_5$ |
| $P_6$ | OUTER | LINE | 90 | $X_6$ | $Y_6$ |

(b) CONTINUOUS LINE FILE (AFTER ERASURE OF PRIORITY PROCESSING SHAPE)

| POINT | OUTER LINE / WINDOW CUT-OUT CATEGORY | POINT TYPE | ANGLE | X COORDI-NATE | Y COORDI-NATE |
|---|---|---|---|---|---|
| $P_1$ | OUTER | LINE | 90 | $X_1$ | $Y_1$ |
| $AP_1$ | OUTER | LINE | -90 | $X_2'$ | $Y_2'$ |
| $P_6$ | OUTER | LINE | 90 | $X_6$ | $Y_6$ |

FIG. 9
(a) 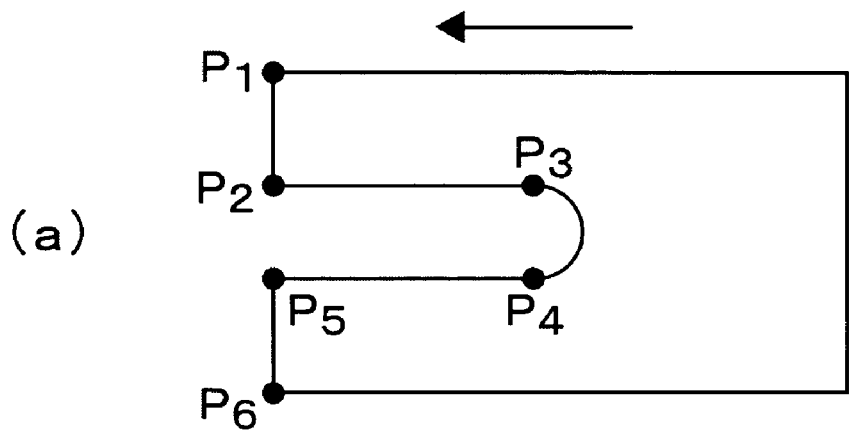
(b) 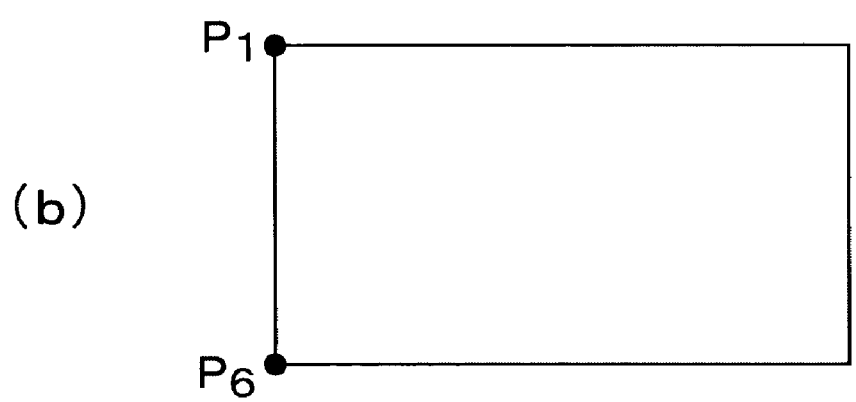

FIG.10

(a) CONTINUOUS LINE FILE

| POINT | OUTER LINE / WINDOW CUT-OUT CATEGORY | POINT TYPE | ANGLE | X COORDI-NATE | Y COORDI-NATE |
|---|---|---|---|---|---|
| $P_1$ | OUTER | LINE | 90 | $X_1$ | $Y_1$ |
| $P_2$ | OUTER | LINE | 90 | $X_2$ | $Y_2$ |
| $P_3$ | OUTER | ARC | −180 | $X_3$ | $Y_3$ |
| $P_4$ | OUTER | LINE | −180 | $X_4$ | $Y_4$ |
| $P_5$ | OUTER | LINE | 90 | $X_5$ | $Y_5$ |
| $P_6$ | OUTER | LINE | 90 | $X_6$ | $Y_6$ |

(b) CONTINUOUS LINE FILE (AFTER ERASURE OF PRIORITY PROCESSING SHAPE)

| POINT | OUTER LINE / WINDOW CUT-OUT CATEGORY | POINT TYPE | ANGLE | X COORDI-NATE | Y COORDI-NATE |
|---|---|---|---|---|---|
| $P_1$ | OUTER | LINE | 90 | $X_1$ | $Y_1$ |
| $P_6$ | OUTER | LINE | 90 | $X_6$ | $Y_6$ |

FIG.12

CONTINUOUS LINE DATA THAT REPRESENTS PROCESSING SHAPE UNIT

| NUMBER | POINT | LINE / ARC CATEGORY | ANGLE | X COORDI-NATE | Y COORDI-NATE |
|---|---|---|---|---|---|
| 0010 | $P_{10}$ | LINE | 90 | $X_{10}$ | $Y_{10}$ |
| 0020 | $P_{20}$ | LINE | -90 | $X_{20}$ | $Y_{20}$ |
| 0030 | $P_{30}$ | ARC | 90 | $X_{30}$ | $Y_{30}$ |
| 0040 | $P_{40}$ | LINE | 90 | $X_{40}$ | $Y_{40}$ |
| 0050 | $P_{50}$ | LINE | 90 | $X_{50}$ | $Y_{50}$ |
| 0060 | $P_{60}$ | ARC | -90 | $X_{60}$ | $Y_{60}$ |
| 0070 | $P_{70}$ | LINE | -90 | $X_{70}$ | $Y_{70}$ |
| 0080 | $P_{80}$ | LINE | -90 | $X_{80}$ | $Y_{80}$ |
| 0090 | $P_{90}$ | LINE | -45 | $X_{90}$ | $Y_{90}$ |
| 0100 | $P_{100}$ | LINE | 135 | $X_{100}$ | $Y_{100}$ |

FIG.14
EXAMPLE OF INTERSECTING LINE ADDED,
OUTER PROCESSING ARC GRAPHICS
(a) $180° \leqq \theta < 360°$
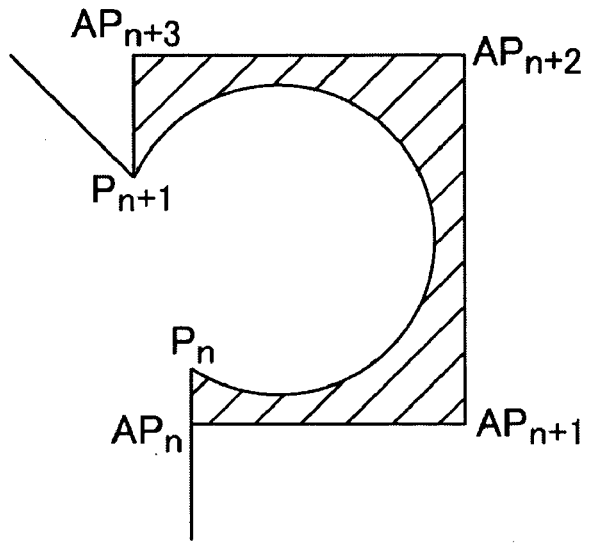
(b) $\theta < 180°$
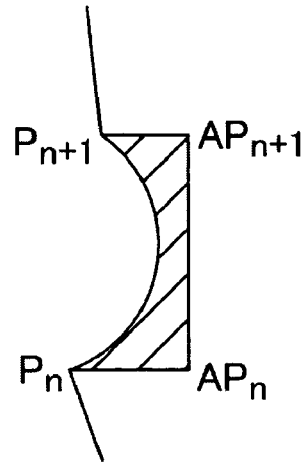
FIG.15
EXAMPLE OF INTERSECTING LINE ADDED,
INNER PROCESSING ARC GRAPHICS
(a) $180° \leqq \theta < 360°$
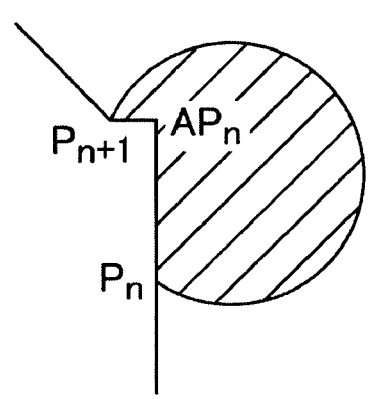
(b) $\theta < 180°$
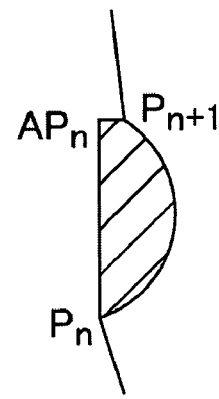

FIG.17
DATA OF MATERIAL SLUG AND REMNANT RECTANGLE CONTINUOUS LINE

| NUMBER | POINT | X COORDI-NATE | Y COORDI-NATE | SIDE POSITION | PRIORITY EXTRACTION | LINE LENGTH | LINE TYPE | START |
|---|---|---|---|---|---|---|---|---|
| 0010 | $P_{10}$ | $X_{10}$ | $Y_{10}$ | B | 1 | 50 | PRODUCT | 1 |
| 0020 | $P_{20}$ | $X_{20}$ | $Y_{20}$ | L | 0 | 180 | PRODUCT | 0 |
| 0030 | $AP_{31}$ | $X_{31}$ | $Y_{31}$ | B | 0 | 240 | PRODUCT | 0 |
| 0050 | $P_{50}$ | $X_{50}$ | $Y_{50}$ | R | 0 | 50 | PRODUCT | 0 |
| 0060 | $P_{60}$ | $Y_{60}$ | $X_{60}$ | B | 0 | 30 | PRODUCT | 0 |
| 0061 | $AP_{61}$ | $X_{61}$ | $Y_{61}$ | R | 0 | 30 | PRODUCT | 0 |
| 0080 | $P_{70}$ | $X_{70}$ | $Y_{70}$ | B | 1 | 130 | PRODUCT | 0 |
| 0090 | $P_{80}$ | $X_{80}$ | $Y_{80}$ | L | 1 | 130 | PRODUCT | 0 |
| 0100 | $P_{90}$ | $Y_{90}$ | $X_{90}$ | T | 0 | 50 | PRODUCT | 0 |
| 0110 | $AP_{91}$ | $Y_{91}$ | $X_{91}$ | L | 0 | 50 | PRODUCT | 0 |
| 0120 | $P_{100}$ | $Y_{100}$ | $X_{100}$ | T | 1 | 400 | MATERIAL | 0 |
| 0130 | $AP_{101}$ | $Y_{101}$ | $X_{101}$ | R | 1 | 280 | MATERIAL | 0 |

FIG.18
REMNANT RECTANGLE CONTINUOUS LINE DRAWING

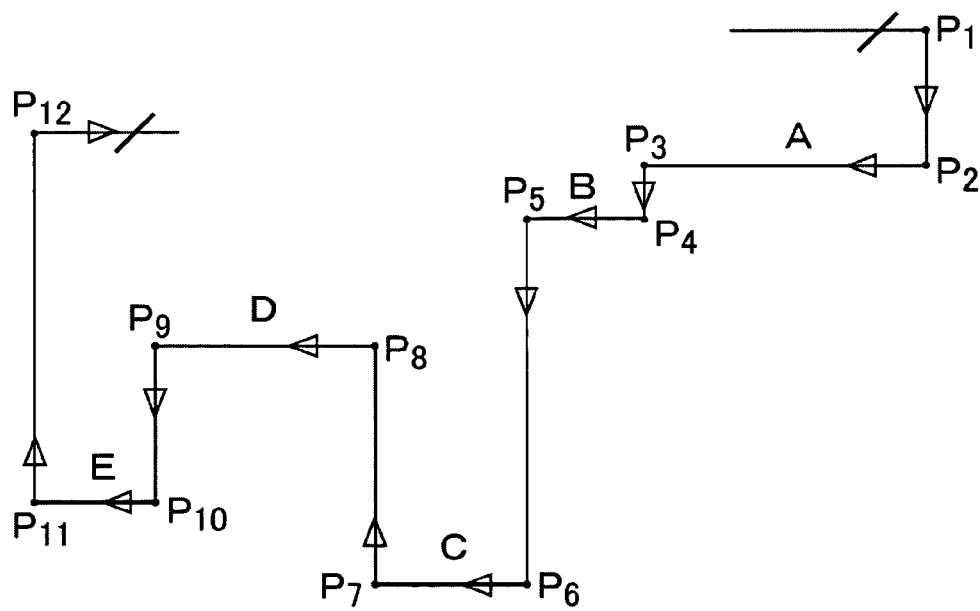

FIG.21
(a)
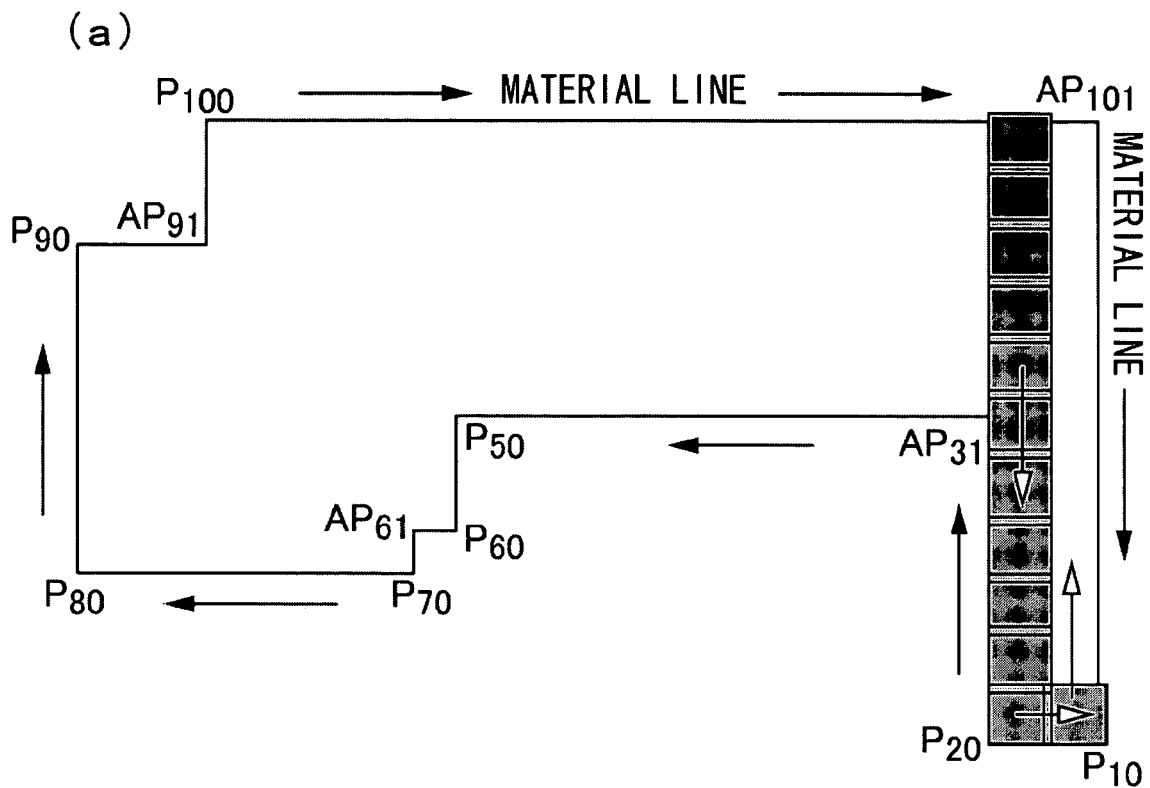
(b)
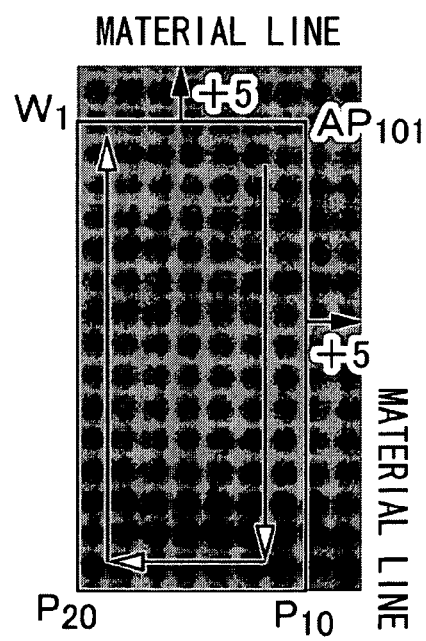

COMPUTER PROGRAM PRODUCT

TECHNICAL FIELD

The present invention relates to a sheet metal CAD/CAM system. Particularly, it is related to a sheet metal CAD/CAM system capable of general tool assignment.

BACKGROUND ART

With the emergence of sheet metal CAD/CAM, control commands (NC commands) for numerical control (NC) machine tools can be output by just placing tools on CAD graphic processing lines, thereby freeing from tool address calculation as well as using calculation expert knowledge for executing NC commands. From the next stage of CAD graphics, outputting automatically executable NC data is currently possible using various methods.

Practical application technology for converting CAD data in unfolded sheet-metal representation drawn with CAD to executable NC data is made up of the following two-step process (see *"SHEET METAL AUTOMATIC CAD/CAM SYSTEM CAMPATH FDM-II"* Press Technology 1991, March Edition pp. 47-53 (THE NIKKAN KOGYO SHIMBUN, LTD., 1991)).

The flow of this process is described referencing FIG. 1. FIG. 1 shows a process flow for converting CAD data in unfolded sheet-metal representation drawn with CAD to executable NC data.

1) Process 1: Automatic Tool Assignment for Sheet Metal Expanded Graphics and Internal Generation of a non-executable NC Program After converting unfolded sheet-metal graphic data generated with CAD (S102) to continuous lines in each shape unit, which represent a product outer line, window cut-out lines, and one-punch lines (as a formed louver that releases heat, the figure is completed through one punch using a forming tool instead of being a processed shape) are defined (S104). Subsequently, a pattern is specified by matching (S106) these continuous lines excluding the one-punch lines with a registered, processing shape pattern file having the same line segment data configuration.

A notched shape and window cut-out shape with variable product outer dimensions included in the sheet metal expanded graphics are processed with automatic tool assignment to each registered, processing shape pattern (S108). With automatic tool assignment, a tool is selected considering information of to-be-used material tensile strength and machine punching tonnage. Punch press sheet metal processing divides a processing shape into multiple processing regions, which are then processed in conformity with a combination of NC processing commands. Problems such as defective overlap processing around divided processing region boundaries, defective processing order, and processing direction as well as the defective shape of the tool to be used and defective processing commands become serious due to formation of material punched slug during processing. With automatic tool assignment, information of material lines, component outer processing lines, window cut-out lines, molding lines, and to-be-used tool shapes is referenced as information to consider these problems, so as to automatically determine the processing order and direction. Problems of unregistered processing shape portions (which should typically be assigned an outline processing tool and require manual correction) that are not assigned an automatic tool, and the defective results of automatic tool assignment are corrected by manual tool assignment (S110). Through these processing, the non-executable NC program (which includes a problem of processing machine damages as is) is internally generated (S112).

2) Process 2: Auto-Correction and Optimization of Non-Executable NC Program

The internally generated, non-executable NC program is automatically converted to an executable NC program, which allows actual processing (S114). This auto-correction and optimization process is incognizant of the processing constraints (such as exceeding the material adjustable range, tool path damaging the processing machine), and an auto-correction process for a manually generated NC program and/or an auto-generated NC program through auto-design and fabrication processes was implemented in the 1970's, wherein a similar process is applied to auto-correction and optimization.

In this manner, through Processes 1 and 2, the sheet metal expanded graphics generated using CAD is converted to an executable NC program.

As described above, after pattern determination in Process 1, a registered processing shape pattern is automatically divided into multiple processing shapes by referencing the tool assignment file for each pattern.

This automatic tool assigning function looks for a processing shape pattern corresponding to a size-variable shape, which has a line segment configuration registered in a sheet metal expanded graphics file (in which continuous line processing, product outer lines, window cut-out lines, material lines, and one-punch lines are defined) generated using CAD, that matches each general processing shape portion in sheet metal processing; thereby applying a corresponding already registered tool selection criterion, to-be-used processing commands, processing order and direction. Automatic tool assigning is implemented for an independent process for each pattern considering overlap processing of adjacent divided processing shapes, processing order, processing direction, or the like. Since unregistered processing shapes are subjected to an outline processing that may leave material slug, manual correction is needed. New processing shape patterns require additional processing; however, there are various types of shapes for every industry, and implementation of highly accurate automatic tool assignment is very difficult.

The above Processes 1 and 2 are basic technologies for automatic conversion of sheet metal CAD graphics to an NC program; however, the remaining greatest concern is solving the problem emanating from a lack of useful registered processing shapes, which are targets for automatic tool assignment.

With punch press machine sheet metal processing, finished products in a single processing industry (e.g., kitchen equipment, control panels, machine tool covers, building outer wall panels) may have the same shape; however, the expanded processing shape may differ for each user. As there are several expanded shapes of a die, various sheet metal part expanded shapes unique to a user develop since sheet metal products pursue specification limits for processing machines (processing size, sheet metal shape interference limitation for bending machines, and the like) and easy assembly fabrication. There are required patterns for the entire sheet metal industry, and thus demands for individual users cannot be met in the future.

There is a pattern backfilling method of controlling the number of registered processing shape patterns, and corresponding various patterns (see Japanese Patent Laid-open No. Hei 6-292930 'Tool assignment method for sheet metal processing graphics'). It is effective in controlling the number of registered patterns, but it does not resolve the problem for unregistered, newly processing shapes.

If there is precision in automatic conversion from a CAD file to an NC program, with current punch pressing, the environment with many restrictions managing and employing multiple NC programs, which are restricted to specified processing machines and mounted tool positions thereon, may be changed to an environment managing and employing only a CAD file. NC programs may also be output by selecting a target processing machine from the managed CAD file prior to processing.

DISCLOSURE OF INVENTION

The objective of the present invention is to implement highly accurate general automatic tool assignment without dependency on registered pattern with a sheet metal CAD/CAM system.

In order to reach the above-mentioned objective, the present invention is inherent in a sheet metal processing CAD/CAM system, which generates an NC program from a CAD drawing, including: division and tool assignment means for searching for the shape of an outer processing arc, the shape of an inner processing arc, and the shape of an oblique line from sheet metal processing graphics of a CAD drawing, and converting them to divided processing shapes enclosed by orthogonal lines, which are then defined as material slug rectangular shapes: rectangular division and tool assignment means for dividing the generated material slug rectangular shapes into rectangles and subjecting them to a tool assignment process; and NC program generation means for generating an NC program from tool assignment data.

Alternatively, further including priority assignment means for searching for a pre-established priority processing shape from the sheet metal processing graphics of the CAD drawing and precedently assigning a tool to that priority processing shape, wherein it is preferable that the division and tool assignment means processes a graphics that has undergone priority assignment processing.

BRIEF DESCRIPTION OF DRAWINGS

FIG. 3, consisting of a, b, c and d, is a diagram for describing a tool assignment process for priority processing shapes;

FIG. 7, consisting of a and b, is a diagram describing updating of continuous lines when performing a tool assignment process for priority processing shapes;

FIG. 8, consisting of a and b, is a diagram describing updating of a continuous line file when performing a tool assignment process for priority processing shapes;

FIG. 9, consisting of a and b, is another diagram describing updating of continuous lines when performing a tool assignment process for priority processing shapes;

FIG. 10, consisting of a and b, is another diagram describing updating of a continuous line file when performing a tool assignment process for priority processing shapes;

FIG. 12 is a diagram showing continuous line data, which represents a processing shape unit in FIG. 11;

FIG. 14 is a diagram showing exemplary graphics of outer processing arcs with added orthogonal lines;

FIG. 15 is a diagram showing exemplary graphics of inner processing arcs with added orthogonal lines;

FIG. 17 is an example of remnant rectangle continuous line data of FIG. 16;

FIG. 18 is a diagram describing priority extraction;

FIG. 21, consisting of a and b, is a diagram describing a tool assignment process for the divided rectangles.

BEST MODE FOR CARRYING OUT THE INVENTION

An embodiment of the present invention is described in detail while referencing the drawings.

Figure 1:
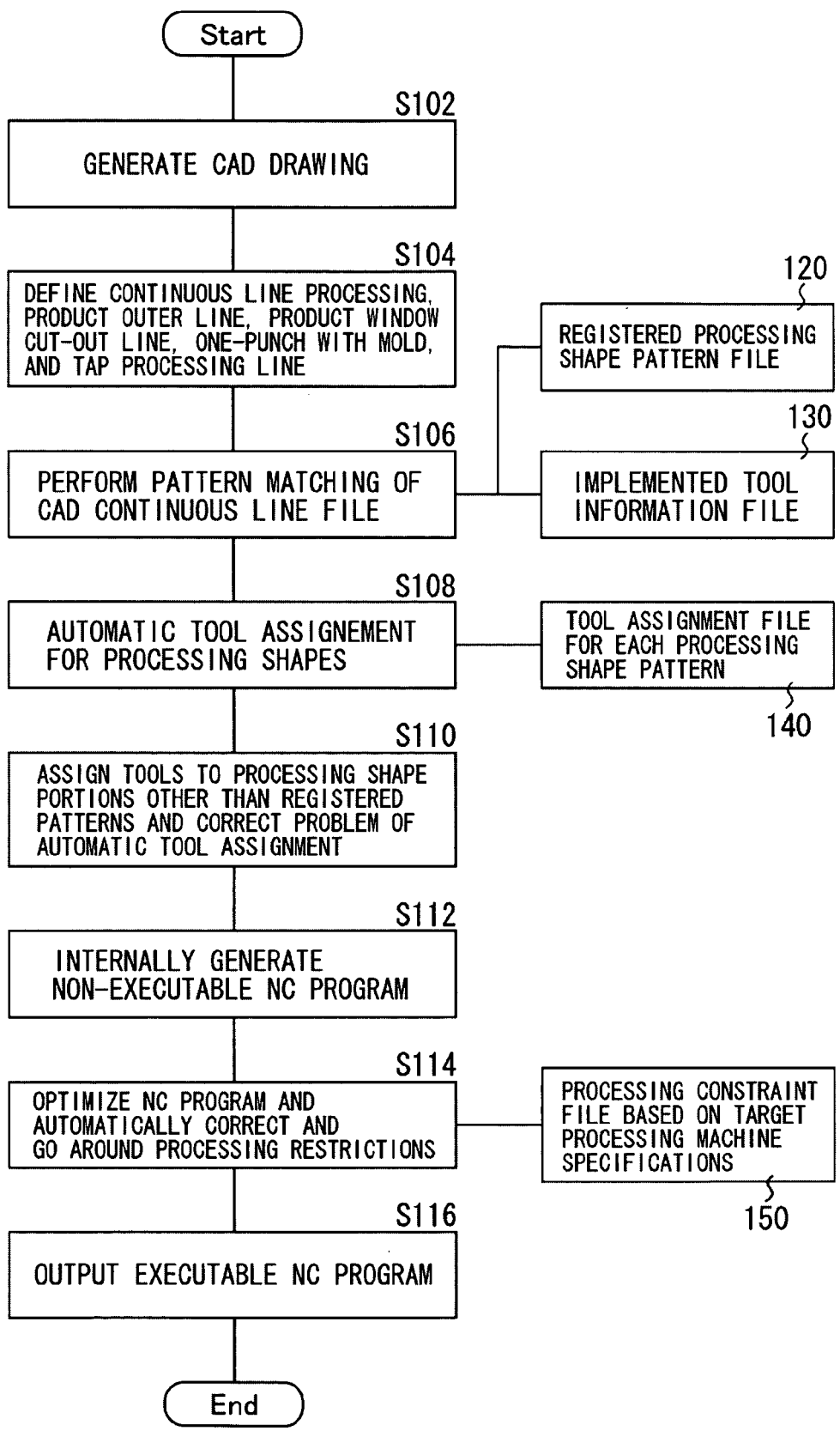
FIG. 1 is a flowchart showing a process for generating an NC program from conventional CAD drawings.
Figure 2:
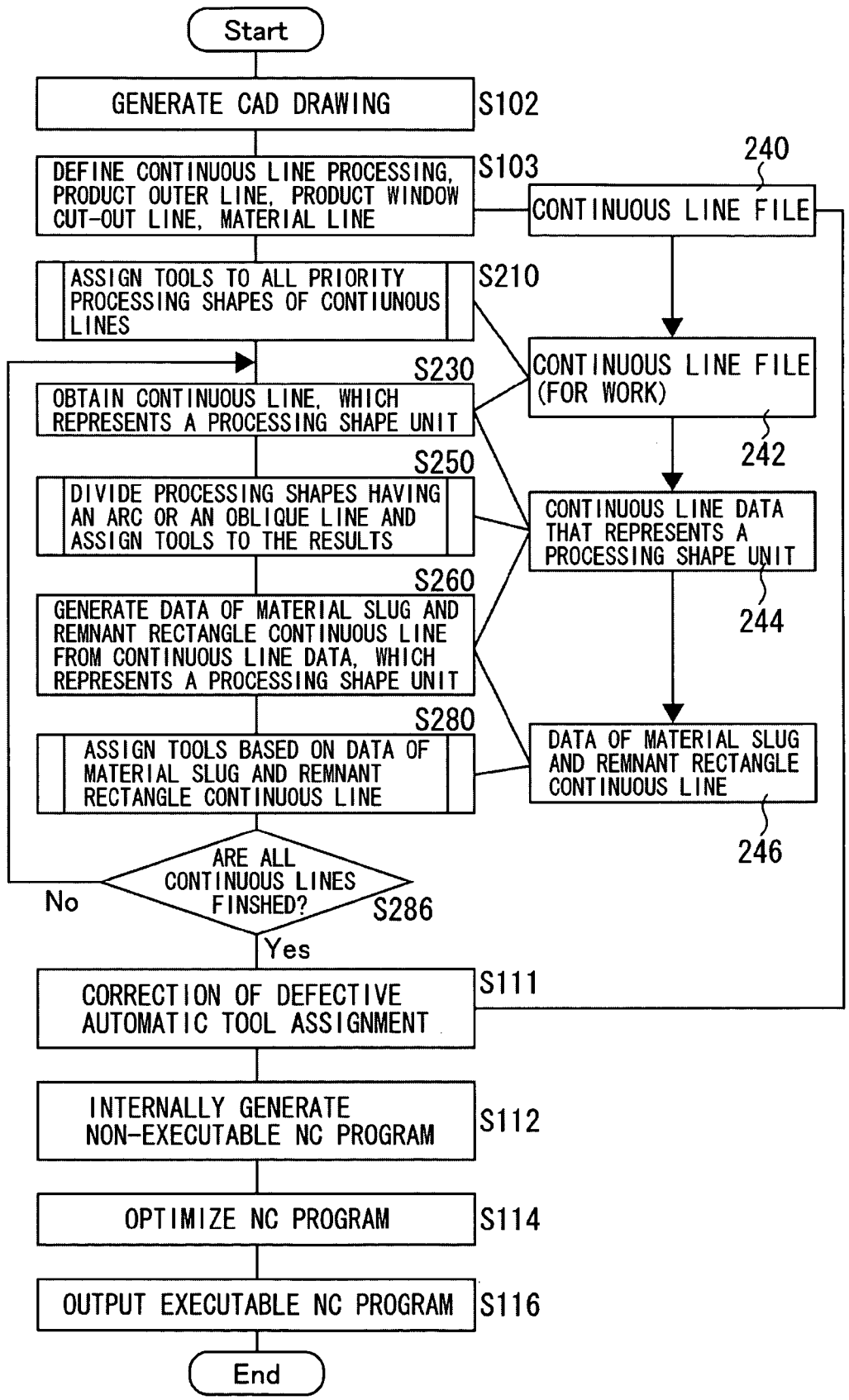
FIG. 2 is a flowchart showing a process for generating an NC program from CAD drawings of an embodiment.
Figure 4:
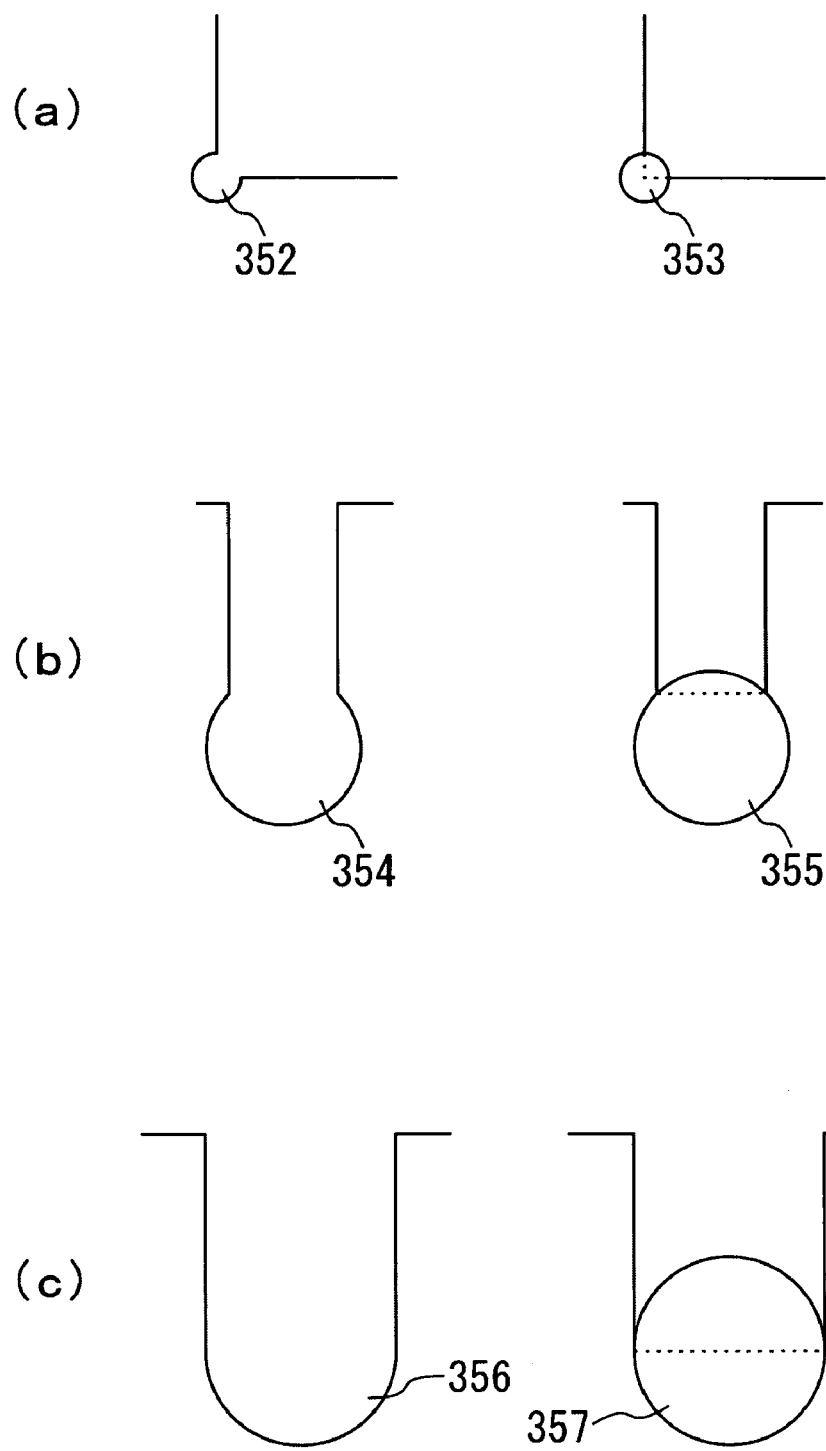
FIG. 4, consisting of a, b, and c, is a diagram for describing a tool assignment process for arcs that may be treated as circles.

FIG. 2 is a flowchart showing processing by a computer according to the embodiment of the present invention. Note that the same symbols are applied in steps carrying out the same processing as in FIG. 1. To begin with, the embodiment is described while referencing this flowchart. Note that the processing of the present invention described forthwith may be carried out by hardware included in a typical high-performance personal computer.

Also with the present invention, as shown in FIG. 2, similar to the conventional processing of FIG. 1, once CAD drawings are generated (S102), and continuous line processing, product outer lines, window cut-out lines, and one-punch lines necessary for the following processing are defined (S103), tools are assigned (S210 through S286).

The basics of the embodiment of the present invention are a general tool assignment process of dividing each of arcs and oblique lines, which forms a processing shape unit, into shapes to which horizontally/vertically orthogonal lines are added (S250), converting the remaining shapes to rectangles, and assigning a tool to each of them (S280), as shown in the flowchart of FIG. 2.

However, there are shapes that conflict with this general tool assignment process, they are, for example, a shape that is obtained by punching a combined shape of an arc and a line using a special tool once or processing through additional punching using that tool, an arc shape that can be treated as a circle, and a V-notched shape with oblique lines. For approximately ten types of these simple shapes, automatic tool assignment is finished, and continuous lines are then corrected and erased by priority using processing shape patterns that have been registered ahead of time (S210).

Subsequently, in the same way as in the conventional example, once a non-executable NC program is generated (S112), the NC program is optimized (S114), and an executable NC program is then output (S116).

The division process for processing units on product outer lines (S250) uses a processing shape unit for automatic tool assignment of line segments configuring a product outer line starting at a material line, which is the smallest rectangle enclosing the product shape, and ending at another material line (S230). Meanwhile, the division process for a processing unit of product window cut-out lines uses individual closed graphics as a single unit. It is divided into processing shapes having an arc and oblique lines along the processing shape continuous line outline. The processing shape units are standardized for a group of divided arcs, right triangles, and rectangles. As a result, the most difficult material slug shapes in sheet metal processing are a vertical and a horizontal linear shape.

Tool assignment simplified to general rectangles, right triangles and rectangles is performed for processing shapes with arcs and oblique lines, which are divided into processing shapes with intersecting lines. The automatic tool assignment process needs information of adjacent line segments influenced by tool interference, information of processing direction when seen from a material end surface or a product processing line, information of processing order, information of whether overlap processing with adjacent shapes is necessary as well as shape information. However, since the position of the automatically divided processing shape in the unit processing shape, which is a divided original graphic, and position of the same in the entire part shape, these pieces of information can be readily accessed. As a result, highly accurate general automatic tool assignment is implemented without dependency on the conventional registered processing shape patterns.

Each process is described in detail forthwith.

(Tool Assignment for Priority Processing Shapes)

A process of assigning tools to priority processing shapes (S210) is described while referencing FIGS. 3 through 9. This tool assignment process for priority processing shapes is performed using a working continuous line file 242, which is copied for working from the continuous line file 240. The continuous line file 240 uses the results from an automatic tool assignment process described below in a tool assignment process in which correction is made manually (S111) (FIG. 2). This is because line segment data in the working continuous line file 242 is partially erased and edited by assigning tools for the priority processing shapes (S210), and therefore referencing the original CAD graphics necessary for a tool assignment process in which manual correction is made is no longer possible.

One priority processing shape is made from the shape of a special tool. A tool capable of a multiple-step process with a single die one-punch is a special die tool. If there is a special die tool in the available tool information, whether or not there is an applicable shape is determined by preferentially retrieving it, and tool assignment is then performed. For example, an elongated tool is a tool combined of an arc and a rectangular shape. When this tool is used, a U-notched shape 322, an elongated circle tool shape 324, and an additionally punched elongated shape 326 and the like shown in the upper drawing of FIG. 3(a) are completed by one punch or additional second or third punches, as shown in the lower drawing of FIG. 3(a), if an elongated circle tool with the same arc is included in the available tool information. This requires performing a process by assigning these special tools with precedence.

Furthermore, a 4 way radius 330, which is the special tool shown in FIG. 3B uses 90° arcs 332, 334, 336, and 338 in the four corners as tool assigning portion shapes, completing processing the outer arcs to approximately R2 to R5, which often appear at sheet metal product corners, through one-punch arc processing.

Next, a tool assignment process for simple processing shapes using registered processing shape patterns is described.

A tool assignment process is performed with precedence for the V-notched shape 310 of FIG. 3(a) as a triangle processed shape. This is a process to avoid a shape with an oblique line from dividing into two oblique lines in a general tool assignment process described later.

Tool assignment to an arc that can be treated as a circle is a process for a priority shape. With this process, an arc processed on the inner side with $180° \leq$ center angle $<360°$ is processed as a circle. This is described referencing FIG. 4. Inner processing is to punch out the inner side of a circle.

FIG. 4(a) shows that an arc 352 in a corner shown on the left side, which is processed on the inner side with a center angle 270°, is processed as a circle 353 shown on the right side. Furthermore, FIG. 4(b) shows that an arc 354 in a lower portion of a rectangle shown on the left side, which is processed on the inner side with a center angle 300°, is processed as a circle 355 shown on the right side. FIG. 4(c) shows that an arc 356 on the left side, which is processed on the inner side with a center angle 180°, is processed as a circle 357 as shown on the right side. Note that a large arc that is difficult to treat as a circle is processed by a general tool assignment process.

As shown in FIGS. 3(c) and 3(d), shapes 342, 344, 346 and 348 including an angle or a circle in the corner are box-type products, and are micro-fabricated using a special tool in a typical processed shape with a width of 3 to 5 mm, which escapes sheet thickness interference strain generating at the bottom of a two-bent surface abutting corner with these cut-in shapes. A priority processing shape process is also performed for these shapes. Processing for the continuous line file when performing the priority processing shape process for these shapes is described while referencing FIGS. 5 through 10.

To begin with, a continuous line is described. This continuous line is the same as that employed in the above-mentioned Japanese Patent Laid-open No. Hei 6-292930 'Tool assignment method for sheet metal processing graphics'.

CAD expanded graphics undergo the continuous line process of FIG. 2, and are then output to the continuous line file 240 having attributes such as product outer lines and product window cut-out lines (S103). Regarding a continuous line, a CAD graphic is represented by a continuous line of lines and an arc. The continuous line is used for various kinds of calculation processes for automatic tool assignment and generation of tool assignment assistance lines. Contents thereof are converted to a form of presentation allowing easy tool assignment calculation of a CAD graphic. The direction of the continuous line herein is presented as counterclockwise for the product outer line (closed graphic) and clockwise for the window cut-out line (closed graphic); and tools are consistently assigned on the right side of the progressing direction of the continuous line. It is also typical to calculate and add a variety of information for simplification of the tool assignment calculation in the processing step of converting line segments configuring the CAD shape to a continuous line.

Figures 5, 6:
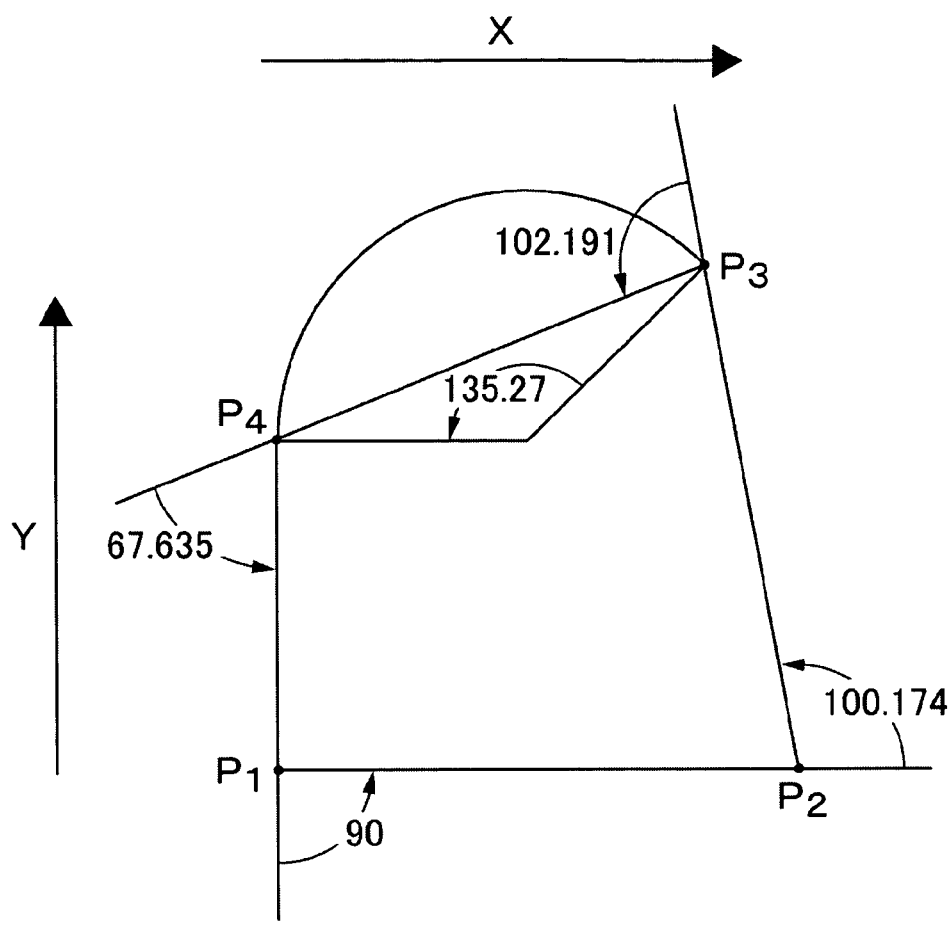
FIG. 5 is a diagram describing presentations of continuous lines.
FIG. 6 is a diagram describing exemplary presentations of the continuous lines in FIG. 5.

Exemplary presentations of continuous lines are described referencing FIGS. 5 and 6. The continuous lines are all presented as point coordinates, types of lines (lines, arcs) starting from those points, and angles.

In the case where a continuous line that starts at a certain point is linear data, the angle thereof is an exterior angle (angle on the outside of a closed graphic) formed from that point, the immediately preceding and the following points. In FIG. 5, points $P_1$ and $P_2$ are examples thereof. Note that point $P_4$ is an endpoint of an arc, and therefore the presentation of the angle is exceptionally different. This will be described later.

Since point $P_1$ is a starting point of a line, the immediately preceding point is point $P_4$. Accordingly, the angle of point $P_1$ is defined to be the exterior angle of points $P_4$, $P_1$ and $P_2$, which is 90°. Furthermore, in the same manner, the angle of point $P_2$ is 100.174°.

In the case where a line starting from a certain point is an arc, the angle thereof is represented by the center angle of the arc up until reaching the next point. The angle of $P_3$ in FIG. 5 is the center angle 135.27° of the arc passing through $P_3$ and $P_4$. Since point $P_4$ is the end point of the arc, the angle of $P_4$ is represented by a combination of the exterior angle 102.191° of point $P_3$ and the exterior angle 67.635° of point $P_4$, which is an angle 169.826° altogether (see FIG. 6).

FIG. 7 and FIG. 9 show changes in a continuous line when processing a priority processing shape. A file storing continuous line data is modified in accordance with the changes in this continuous line as shown in FIG. 8 and FIG. 10.

To begin with, FIG. 7 and FIG. 8 are described. FIG. 7(a) shows the form of continuous lines just before processing a priority processing shape. The shape formed of $P_2$, $P_3$, $P_4$, and $P_5$ in FIG. 7(a) is one type of priority processing shape. Exemplary data stored in the continuous line file corresponding to the shape of FIG. 7(a) is shown in FIG. 8(a). This exemplary continuous line also includes classification of either an outer line or a window cut-out line, and data of X and Y coordinates of points.

When a priority processing shape process is performed for the processing shape shown in FIG. 7(a), a tool assignment process is performed for the processing shape ($P_2$, $P_3$, $P_4$, $P_5$) formed by $P_2$, $P_3$, $P_4$, and $P_5$, and the portion of the processing shape ($P_2$, $P_3$, $P_4$, $P_5$) that has been processed is then erased from the continuous line. As in FIG. 7(b), this process is performed by extending the line passing through $P_1$ and $P_2$ and line passing through $P_5$ and $P_6$, which are respectively connected to the priority processing shape, newly adding a point $AP_1$ at the intersection thereof, and then erasing the priority processed shape portion. The continuous line data corresponding to FIG. 7(b) is given in FIG. 8(b).

Next, an example of processing of priority processing shapes is described referencing FIGS. 9 and 10.

A priority processing shape process is performed for the shape ($P_2$, $P_3$, $P_4$, $P_5$) formed of $P_2$, $P_3$, $P_4$, and $P_5$ in FIG. 9(a). Exemplary continuous line data corresponding to the shape shown in FIG. 9(a) is shown in FIG. 10(a).

When a priority processing shape process is performed for the shape ($P_2$, $P_3$, $P_4$, $P_5$) shown in FIG. 9(a), as in FIGS. 7 and 8, a tool assignment process is performed for the processing shape ($P_2$, $P_3$, $P_4$, $P_5$), and the portion of the processed shape ($P_2$, $P_3$, $P_4$, $P_5$) is then erased from the continuous line. As a result of erasure, as shown in FIG. 9(b), the line ($P_1$, $P_2$) and the line ($P_5$, $P_6$) respectively connected to a priority processing shape are extended, becoming a line ($P_1$, $P_6$). Exemplary continuous line data corresponding to this is given in FIG. 10(b).

In this manner, when the priority processing shape process (S210) is performed, the shape that has been assigned a tool is then erased from the continuous line file. The tool assignment process for this priority processing shape is performed in the same way as with the conventional tool assignment process, and the tool assignment data is stored so that an un-executable NC program can be generated later, as with the prior art.

Note that as targets to be subjected to the priority processing shape (such as a simple processing shape) process, less than ten shapes are under consideration, excluding special dies.

(General Tool Assignment Process)

Regarding sheet metal processing shapes, line segments that make difficult punching without leaving any material slug include angular lines except for a horizontal and a vertical line, and processing of the inner regions of arcs with a center angle <180° and the outer regions of arcs with all angles is difficult. The processing shapes including these line segments cannot be treated as the aforementioned circle, making it difficult to process remnant material slug shapes after processing. These processing shapes are divided into shapes closed by two or three intersecting lines, implementing integration and simplification of the division processing target shape and simplification of material slug shape processing.

The general tool assignment process is described in detail referencing FIGS. 11 through 22.

Figure 11:
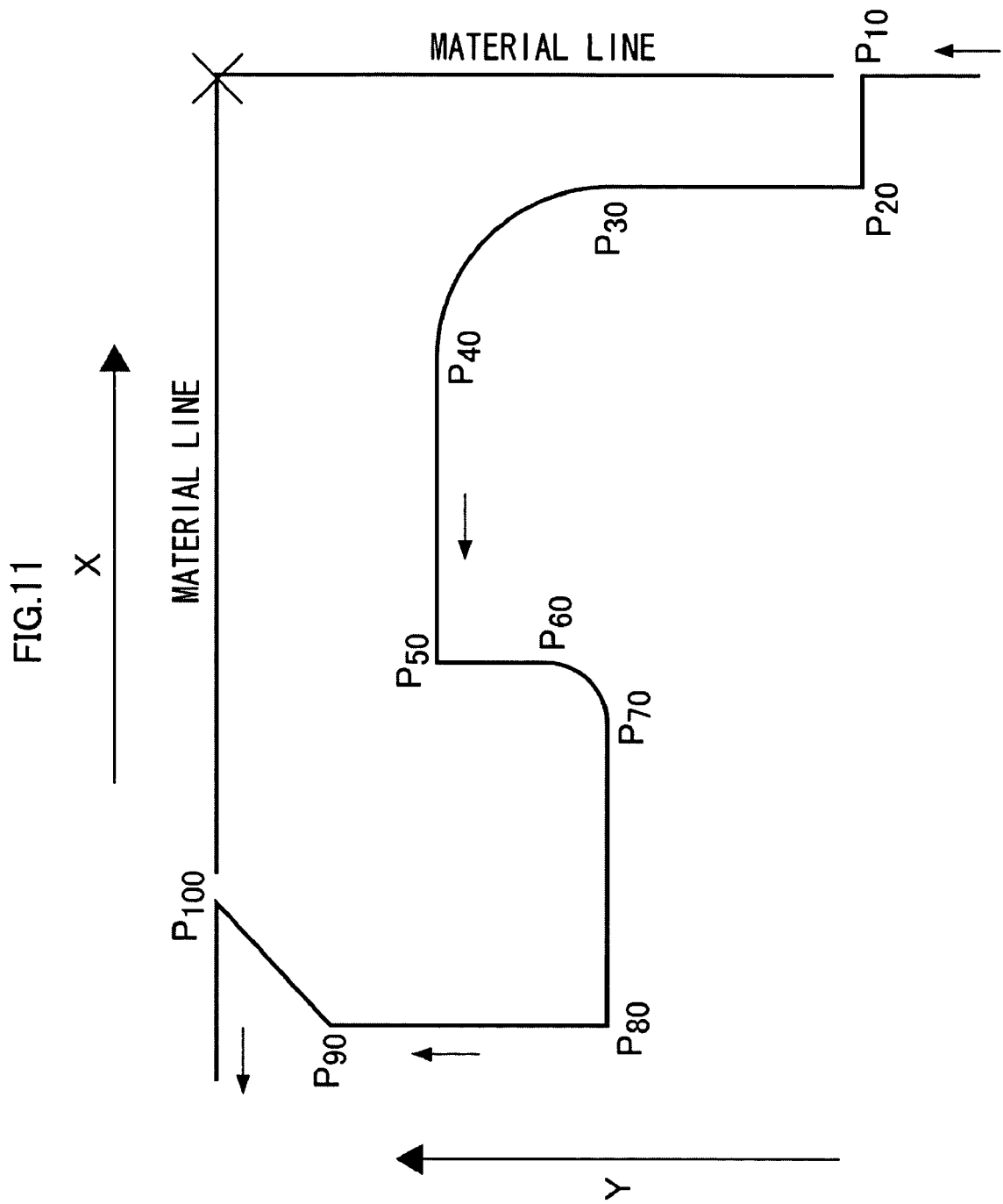
FIG. 11 is a diagram showing an example of a processing shape unit for a general automatic tool assignment process.

FIG. 11 shows an example of a processing shape unit for the general tool assignment process. The general tool assignment process is described forthwith with the exemplary shape in FIG. 11.

A processing shape unit, which is a target to be subjected to the general tool assignment process, in the case of product outer lines as in the example of FIG. 11, is the section from $P_{10}$, which is a point separated from the material line, to $P_{100}$, which is a point returning to the material line. Note that in the case of product window cut-out lines, a product window cut-out shape, which is a closed graphic, becomes a single unit. Continuous line data corresponding to the processing shape unit is given in FIG. 12. To perform the general tool assignment process, to begin with, continuous line data 244 (see FIG. 2), which represents a processing shape unit, is obtained (S230).

For the general tool assignment process, to begin with, with the continuous line data of the processing shape unit $P_{10}$-$P_{100}$ in FIG. 12, the division process is performed for processing shapes having oblique lines, and the tool assignment process is then performed for the divided shapes.

Figure 13:
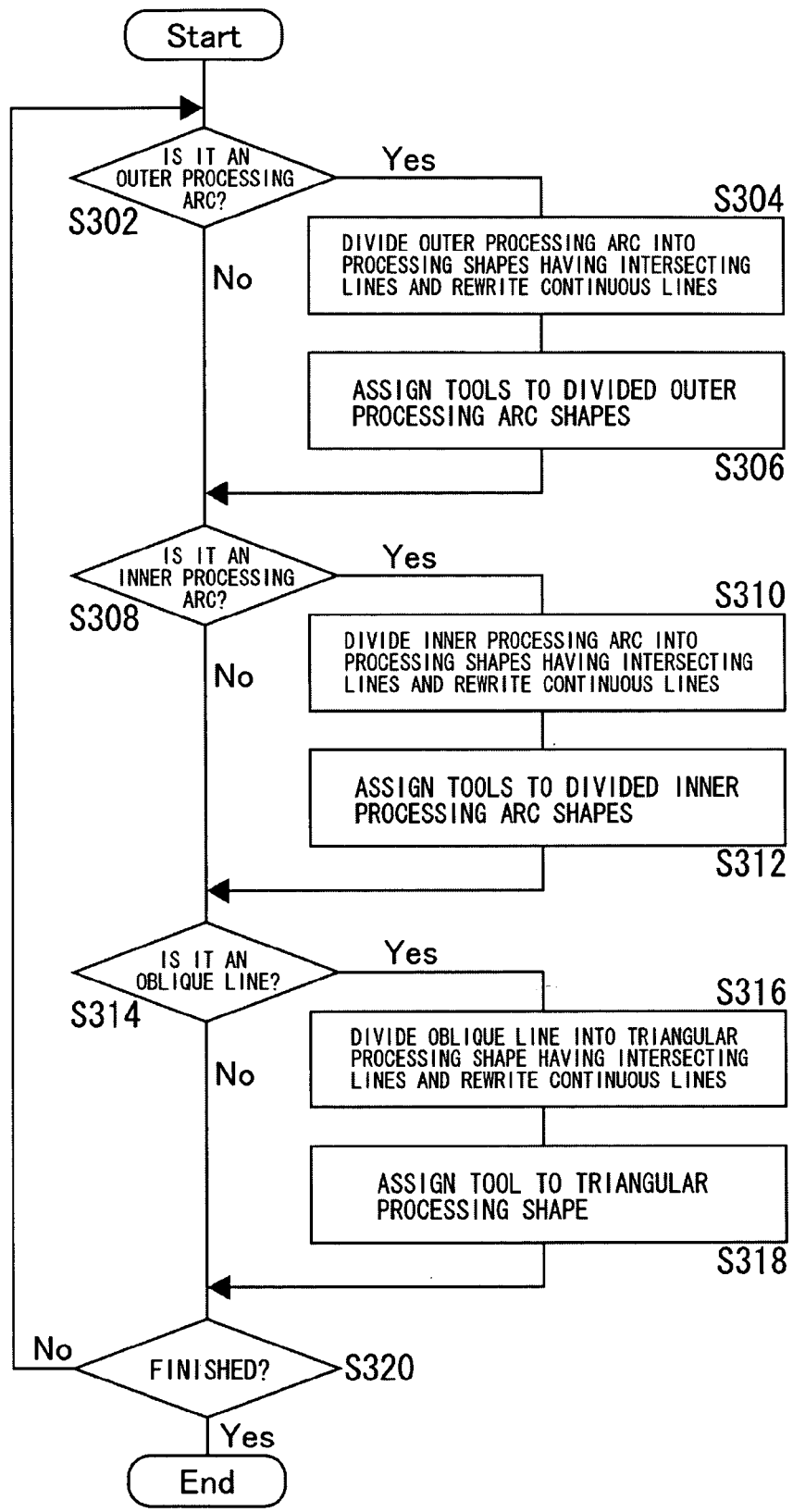
FIG. 13 is a flowchart for a division/tool assignment process for arcs and oblique lines.

A flowchart given in FIG. 13 shows the division process for a processing shape unit. The processing shown in the flowchart of FIG. 13 is described in detail forthwith using an example of a processing shape unit shown in FIGS. 11 and 12.

Note that the processing order for each of the processing shapes given below does not have order of precedence, and may be performed in any order.

(Outer Processing Arc Shape)

In FIG. 13, in the case where an outer processing arc shape ($P_{30}$, $P_{40}$) (center angle of 90° counter clockwise) of FIG. 11 (YES in S302) has been found, a processing shape having intersecting lines (see shape ($P_{30}$, $AP_{31}$, $P_{40}$) in FIG.

16) is divided (S306). The outer processing arc shape means a shape of which the outside of the arc is to be processed.

When an outer processing arc ($P_{30}$, $P_{40}$) with a central angle 90° passing through the two points $P_{30}$, $P_{40}$ is detected (YES in S302), this division process, to begin with, extends lines parallel to the Y-axis and the X-axis from the starting point $P_{30}$ and end point $P_{40}$ of the arc, respectively, generating an intersecting point $AP_{31}$ thereof. The processing shape unit is divided using the shape ($P_{30}$, $P_{40}$, $AP_{31}$) represented by the generated intersecting point, the starting point, and the end point (S304). At this time, $AP_{31}$ is added to continuous line data 244, which represent a processing shape unit, and point $P_{30}$ on the line ($P_{20}$, $AP_{31}$) and point $P_{40}$ on the line ($AP_{31}$, $P_{50}$) are erased (see FIG. 16).

The divided shape ($P_{30}$, $P_{40}$, $AP_{31}$) is passed on to an arc tool assignment process (S306), which then carries out a tool assignment process in the same way as with the conventional method.

FIG. 14 shows exemplary modified graphics of divided graphics generated due to conditions of starting angles and ending angles when outer processing arcs. FIG. 14(*a*) is an example where the arc center angle θ satisfies 180°≦θ<360°, and FIG. 14(*b*) is an example where the arc center angle θ<180°.

In the example where the arc center angle θ satisfies 180°≦θ<360° shown in FIG. 14(*a*), intersecting lines ($AP_n$, $AP_{n+1}$), ($AP_{n+1}$, $AP_{n+2}$), ($AP_{n+2}$, $AP_{n+3}$) parallel to either the Y-axis or the X-axis, which are separated an appropriate distance (e.g., 5 mm) from respective arc tangent points are drawn, forming a divided processing shape ($P_n$, $AP_n$, $AP_{n+1}$, $AP_{n+2}$, $AP_{n+3}$, $P_{n+1}$), which allows mass processing of only the arc. At this time, the four points $AP_n$, $AP_{n+1}$, $AP_{n+2}$, and $AP_{n+3}$, which are intersecting points of the lines, are newly generated. This divided shape can be precisely and easily processed.

In the example where the arc center angle θ<180° shown in FIG. 14(*b*), the processing shape ($P_n$, $AP_n$, $AP_{n+1}$, $P_{n+1}$), which is formed of a line ($AP_n$, $AP_{n+1}$) parallel to the Y-axis separated at an appropriate distance (i.g., 5 mm) from an arc tangent point, and lines ($P_n$, $AP_n$) and ($AP_{n+1}$, $P_{n+1}$) parallel to the X-axis extending from the starting point $P_n$ of the arc to the end point $P_{n+1}$ forms a divided processing shape.

$AP_n$ and $AP_{n+1}$ are intersecting points of the line ($AP_n$, $AP_{n+1}$) and the lines ($P_n$, $AP_n$) ($AP_{n+1}$, $P_{n+1}$), respectively. These intersecting points $AP_n$ and $AP_{n+1}$ are newly generated points.

In this manner, an arc outside processing shape is divided and subjected to a tool assignment process.

(Inner Processing Arc Shape)

An inner processing arc shape ($P_{60}$, $P_{70}$) is divided into processing shapes having intersecting lines. This inner processing arc shape denotes a processing shape having a shape with the inner side of an arc punched out.

Figure 16:
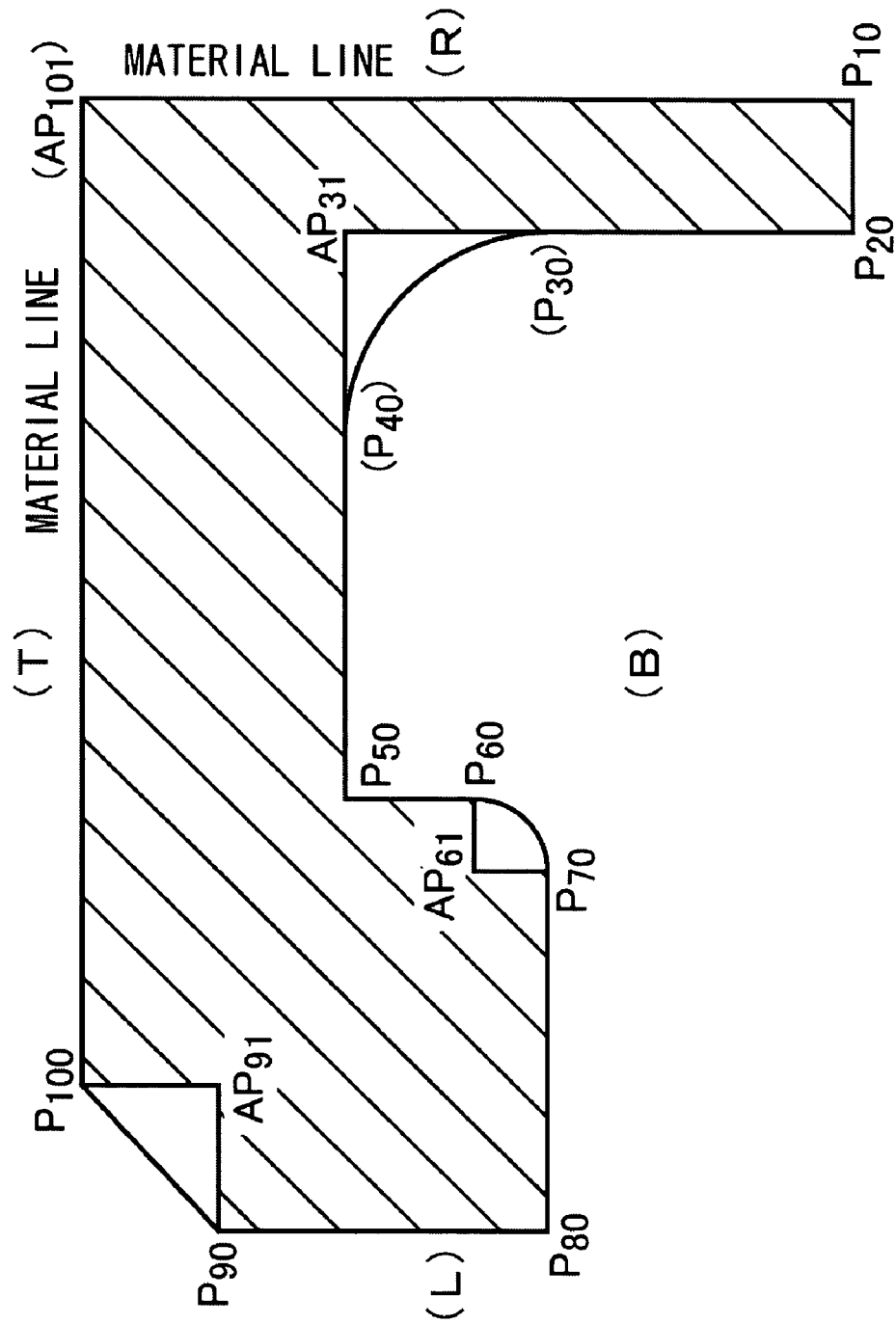
FIG. 16 is a diagram after the arcs and the oblique lines in the example of the processing shape unit in FIG. 11 have been subjected to the division and tool assignment processes.

In FIG. 13, when an arc with a central angle +90° passing through the two points $P_{60}$, $P_{70}$ is detected (YES in S308), an intersecting point $AP_{61}$ of lines parallel to the X-axis and the Y-axis passing through the two points of a continuous line $P_{60}$, $P_{70}$ is generated (see FIG. 16). A processed shape ($P_{60}$, $P_{70}$, $AP_{61}$) is divided into processing shape units (S310), and then passed on to an arc tool assignment process (S312). At the same time, $AP_{61}$ is added to the continuous line data 244, which represents a processing shape unit. With the arc tool assignment process, tools are assigned in the same way as the conventional method.

FIG. 15 shows exemplary modified graphics of divided graphics generated under conditions of starting angles and ending angles for arc inner processing. FIG. 15(*a*) is an example where the arc center angle θ satisfies 180°≦θ<360°, and FIG. 15(*b*) is an example where the arc center angle θ<180°.

In the example where the arc center angle θ satisfies 180°≦θ<360° shown in FIG. 15(*a*), the processing shape ($P_n$, $AP_n$, $P_{n+1}$), which is formed of an arc starting from a point $P_n$ to the end point $P_{n+1}$, and lines ($P_n$, $AP_n$) and ($AP_n$, $P_{n+1}$) parallel to the Y-axis and the X-axis, respectively, is defined to be a divided processing shape. Here, the intersecting point $AP_n$ of these lines is newly generated.

In the example where the arc center angle θ<180° shown in FIG. 15(*b*), the processing shape ($P_n$, $AP_n$, $P_{n+1}$), which is formed of an arc starting from a point $P_n$ to the end point $P_{n+1}$, and lines ($P_n$, $AP_n$) and ($AP_n$, $P_{n+1}$) parallel to the Y-axis and the X-axis, respectively, is defined to be a divided processing shape.

In this manner, an inner processing arc shape is divided and subjected to a tool assignment process.

(Oblique Line)

In the flowchart of FIG. 13, if an oblique line ($P_{90}$, $P_{100}$) of FIG. 11 is found (YES in S314), it is then divided into processing shapes having intersecting lines (S316).

If the oblique line ($P_{90}$, $P_{100}$) is detected (S314), lines parallel to the X-axis and the Y-axis, respectively, are then drawn (see FIG. 16). The processing shape unit is divided providing a processing shape ($P_{90}$, $P_{100}$, $AP_{91}$) formed of an intersecting point AP91 of those lines and the oblique line ($P_{90}$, $P_{100}$) (S316), which is then passed on to a triangle tool assignment process (S318). At the same time, $AP_{91}$ is added to the continuous line data 244, which represents a processing shape unit. This intersecting point AP91 of the lines is provided on the outside of the oblique line. With the triangle tool assignment process (S318), tools are assigned in the same way as with the conventional method.

In this manner, division and tool assignment processes are performed for each shape throughout each respective processing shape unit (YES in S320).

(Tool Assignment Process for Material Slug Rectangular Shape)

Returning to the flowchart of FIG. 2, when the division/tool assignment processes (S250) are finished, the continuous line data 244, which represents a processing shape unit, represents a material slug rectangular shape (oblique line portion of FIG. 16). This material slug rectangular shape is structured from horizontal lines parallel to the X-axis and vertical lines parallel to the Y-axis.

A rectangular cut-out process for the material slug rectangular shape, which is structured from horizontal lines and vertical lines, and tool assigning thereof are described hereafter in detail while referencing FIGS. 16 to 21.

(Generation of Material Slug/Remnant Rectangle Continuous Line Data)

To begin with, material slug/remnant rectangle continuous line data 246 (see FIG. 17) is generated from the continuous line data 244, which represents a processing shape unit (S260). Using this material slug/remnant rectangle continuous line data 246, a material slug rectangular shape is divided into rectangles, and the divided rectangles are then subjected to a tool assignment process (S280).

The material slug/remnant rectangle continuous line data in FIG. 17 is described below.

The remnant rectangle continuous line data made up of product outer lines (counterclockwise) becomes the reverse direction of the continuous line or clockwise since a material line is added to a cut graphic at the start and end of a material line. Since the linear direction for the remnant rectangle continuous line data made up of product window cut-out lines does not change, it is clockwise regardless of being an outer line or window cut-out line. Furthermore, these remnant rectangle continuous lines are made of only horizontal and vertical lines.

Rectangles are cut out using the remnant rectangle continuous line data in FIG. 17; however, in order to easily determine width and depth directions of the rectangles, a data item of 'Side Position' is provided. With this data item, when the rectangular oblong continuous line shape is overall a rectangle, 'T' (T-Top) means upper side, 'B' (B: Bottom) means lower side, 'R' (R: Right) means right side, and 'L' (L: Left) means left side. This data is organized based on the linear direction of the continuous line data 244, which represents a processing shape unit.

In FIG. 16, $P_{10}$, for example, has the same Y coordinate as the next $P_{20}$ but a decreased X coordinate, and such line segment can be determined as 'B' (lower side) (see FIG. 17). Similarly, $P_{20}$ has the same X coordinate as the next $AP_{31}$ but an increased Y coordinate, and the side position thereof can be determined as 'L' (see FIG. 17). 'T' and 'R' can be similarly determined.

Next, a data item 'Priority Extraction' is described. This means that when there is a "1" for this item, a rectangle formed of those lines is generated with priority.

This is described using an example of remnant rectangles shown in FIG. 18. With this example, line segments C and E, which are bottoms of concave portions, are lines that are selected with priority from among the line segments A, B, C, D, and E with 'B'. The reason for this selection is that the line segments C and E are the bottoms of concave shapes, and material slug processing shapes are converted to simpler shapes by selecting these line segments, leveling the concave portions, and eliminating uneven shapes. The line segments C and E are selected and corresponding 'Priority Extraction' flags are set to 1, and those for the other line segments A, B, and D are set to 0.

The method of determining the line segment C as being a shape forming the bottom of a concave portion is described. Necessary continuous line points for this determination are $P_5$, $P_6$, $P_7$, and $P_8$. Since the line segment ($P_6$, $P_7$) is horizontal (namely, 'B'), it can be determined that these points have the same Y coordinate, and that it forms a concave shape if this Y coordinate is compared to those of $P_5$ and $P_8$.

If a continuous line point of a to-be-determined line segment is given as $P_n$ and coordinate values thereof as $X_n$ and $Y_n$, the preceding point is given as $P_{n-1}$, and coordinate values thereof as $X_{n-1}$ and $Y_{n-1}$, and the second subsequent point is given as $P_{n+2}$ and coordinate values thereof as $X_{n+2}$ and $Y_{n+2}$, the priority extraction conditions for the 'Side Position' category for $P_n$ are as follows.

Conditions for priority extraction=1

Side Position: For point $P_n$ line segment with 'T', $Y_n > Y_{-1}$ and $Y_n > Y_{n+2}$ Side Position: For point $P_n$ line segment with 'B', $Y_n < Y_{n-1}$ and $Y_n < Y_{n+2}$ Side Position: For point $P_n$ line segment with 'R', $X_n > X_{n-1}$ and $X_n > X_{+2}$ Side Position: For point $P_n$ line segment with 'L', $X_n < X_{n-1}$ and $X_n < X_{n+2}$ For the categories of item 'Line Type', there are three types: product, material and cut. Product type refers to a line that becomes a product at the end of sheet metal processing, and material type refers to an original line of a material to be cut out in sheet metal processing. Furthermore, cut type refers to a line generated in a process of cutting out a rectangle when processing material slug.

With this remnant rectangle process, since the type of each of vertical and horizontal lines is determined line by line, product and cut, and material and cut types may be the same straight line; however, line types thereof in this case are given as product and material, respectively. Note that lines ($P_{20}$, $AP_{31}$, $P_{60}$, $P_{90}$, $AP_{91}$ in FIG. 16) generated as a result of dividing this shape in terms of arcs and oblique lines are product type.

The item 'Start' is a flag indicating the starting point of a remnant rectangle continuous line that is a closed curve. The process for remnant rectangle continuous line data starts at a point with a 'Start' flag of "1". This flag is beneficial to recognize and deal with the number of closed curves represented by remnant rectangle continuous line data when that data includes multiple closed curves. Note that although it is not described above, a similar flag is used for the continuous line data.

When determining a category of this line type, the stored continuous line file 240 generated at the beginning is referenced if necessary.

(Rectangular Division Process)

Figure 19:
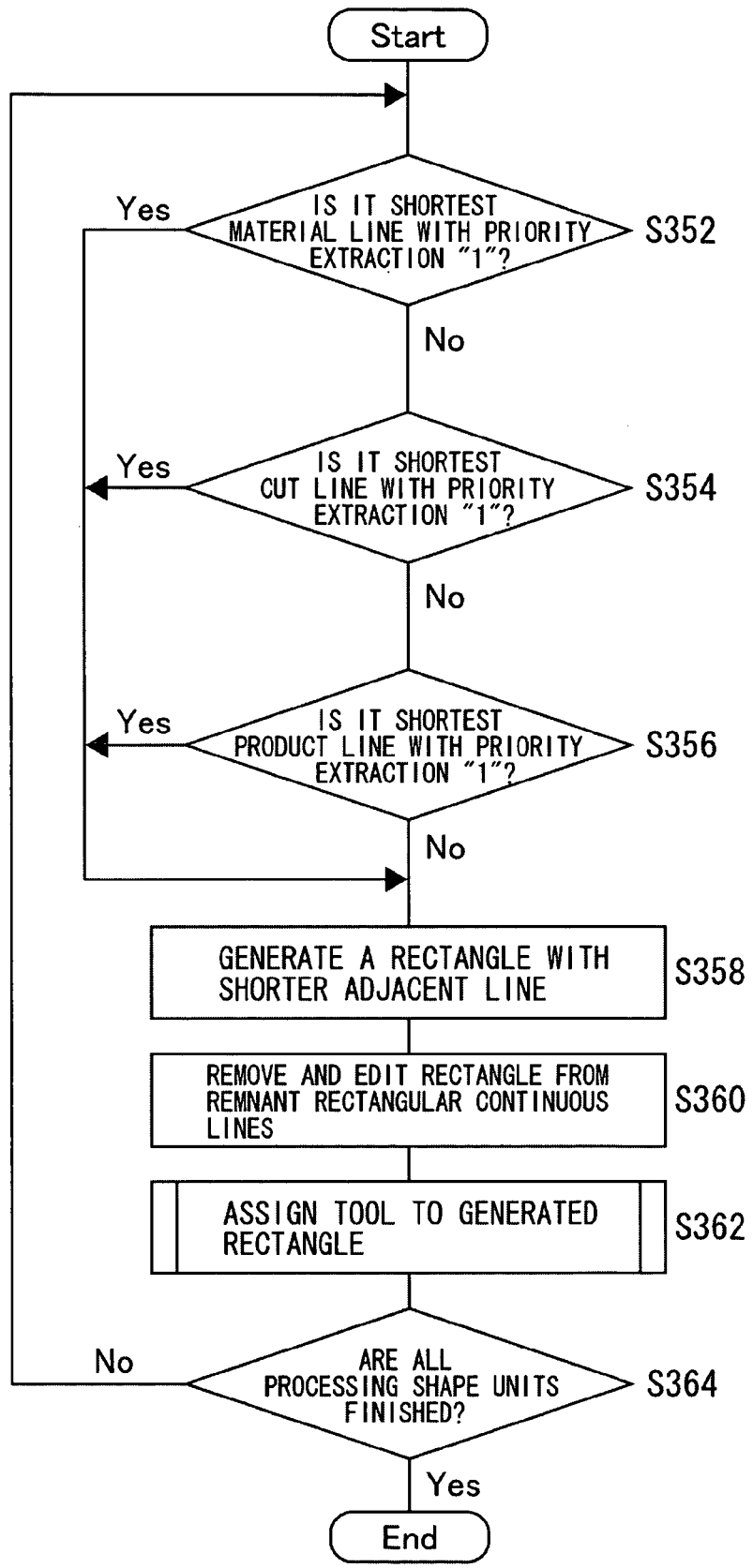
FIG. 19 is a flowchart showing a process of rectangular division and tool assignment for material slug and remnant rectangles.
Figure 20:
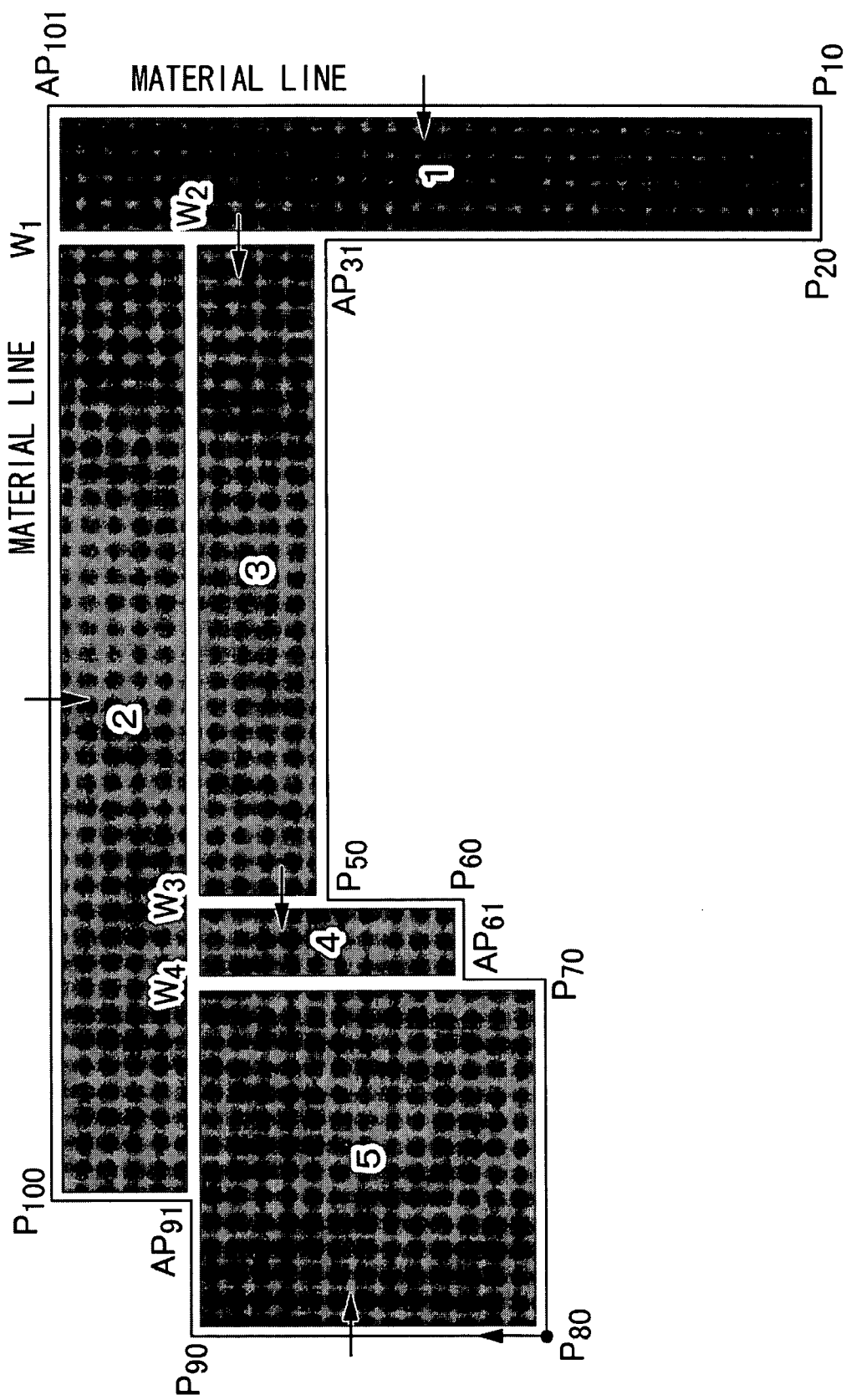
FIG. 20 is a diagram showing a rectangular division process for FIG. 16.

Generating rectangles from the remnant rectangle continuous line data and the process of assigning tools to the generated rectangles (S280) are described referencing FIGS. 17, 20, and 21, and a flowchart in FIG. 19.

To begin with, a process of forming a rectangle (S352 through S358) is described. Determination conditions for extracting lines forming a rectangle are determined in the following extracting order of precedence from the remnant rectangle continuous line data with the 'Priority Extraction' flag of "1" (S352 through S356).

1. Line Type: minimum line length for "material" (S352)
2. Line Type: minimum line length for "cut" (S354)
3. Line Type: minimum line length for "product" (S356)

This process is described referencing FIG. 20, which shows an example of rectangular division of the remnant rectangle continuous lines of FIG. 16 and FIG. 17.

A line with a minimum line length is extracted from those with the 'Priority Extraction' flag of "1" and the 'Line Type' being "material" (S352). Accordingly, AP101 is extracted from two lines P100 and AP101 with the 'Line Type' of "material" in the remnant rectangle continuous lines of FIG. 17. A rectangle 1 (AP$_{101}$, P$_{10}$, P$_{20}$, W$_1$) is formed using the shorter line P$_{10}$ from the next lines P$_{10}$ and P$_{100}$. W$_1$ is a newly generated point when forming the rectangle 1. This is shown in FIG. 20. Note that arrows indicate the initially selected line segments during rectangle formation. In this manner, the shorter one is selected when forming the rectangle for the purpose of leveling unevenness. An editing process for the remnant rectangle continuous line data by generation of this point W$_1$ and rectangle extraction (S360) is similar to a process of editing the continuous line file relating to the priority processing shape process. Processing of 1. Setting 4 types of data segments T, B, R, and L for 'Side Position'
2. Setting 'Line Type' data
3. Setting 'Priority Extraction' data and the like by the generation process for the remnant rectangle continuous line data (S244) are also performed. After this editing process, the remnant rectangle continuous line data results in $AP_{31}$, $P_{50}$, $P_{60}$, $AP_{61}$, $P_{70}$, $P_{80}$, $P_{90}$, $AP_{91}$, $P_{100}$, and $W_1$. The 'Line Type' of the newly generated $W_1$ is "cut".

Next, a tool assignment process for the generated rectangles (S362) is described referencing FIG. 21.

When performing tool assignment, the processing direction for the tool needs to be in the direction to those with the 'Line Type' of "product". This is described referencing FIG. 21(a). FIG. 21(a) is a diagram of when the rectangle 1 in FIG. 20 is extracted.

In this diagram, the processing direction is taken so as to punch out in the direction of the material line $P_{20}$ with the 'Line Type' of "product". Therefore, immediately after the corner of $P_{10}$ is punched out, the processing areas (blank portions) are separated from the material, and the resulting cut out slug on the material line along with the material line itself are simultaneously punched out, leading to problems in production.

As a result, when assigning a tool to the rectangle 1, approximately 5 mm (registered set parameter) of the overlapped processing portion is outwardly taken since the line segments ($P_{10}$, $P_{20}$) and ($AP_{10}$, $W_1$) are material lines. Consequently, as shown in FIG. 21(b), once rectangle information of $P_{10}$ ($X_{10}$+5, $Y_{10}$), $AP_{101}$ ($X_{101}$+5, $Y_{101}$), and $W_1$ ($X_{w1}$, $Y_{w1}$+5), which result from increasing the coordinates of the extracted rectangle by 5 mm, and the processing direction (from the material line segment ($AP_{101}$, $P_{10}$) towards the product line segment ($P_{20}$, $W_1$)) are additionally specified, they are then passed on to a tool assignment process. In FIG. 21(b), black arrows indicate the overlapped processing direction, and white arrows indicate the processing direction.

This tool assignment process for this rectangle will finish by preparing a single NC processing command with the displayed processing direction.

Note that a method of repeating a command for each of the portions divided in the direction from top to bottom and from right to left in FIG. 21(b) is more reliable. This is a method for strictly maintaining the processing direction from the upper right to the lower left along the rectangle length and from the material surface to the product surface.

In this manner, a conventional tool assignment process is executed for the extracted rectangle by adding information of processing order and direction.

Returning to the flowchart of FIG. 19, since the rectangle 1 is formed (S358) and the formed rectangle 1 is subjected to a tool assignment process (S362) but processing is not finished yet (NO in S364), processing returns again to the process of rectangle formation and tool assignment.

The shortest material line with the 'Priority Extraction' flag of 1 is extracted from the updated remnant rectangle continuous line data (S352), and a shorter line ($AP_{91}$) from between the adjacent lines ($W_1$, $AP_{91}$) and a rectangle 2 ($P_{100}$, $W_1$, $W_2$, $AP_{91}$) are formed (S358: see FIG. 20).

This rectangle 2 also has material lines and cut lines; therefore, the graphic is expanded along the material line and the cut line considering to-be-executed overlap processing, and data taking a processing direction of the material line segment ($P_{11}$, $W_2$) to the product line segment ($AP_{91}$, $W_2$) is generated.

Next, the rectangle is erased; the remnant rectangle continuous line data is edited (S360); and a tool assignment process (S362) is then performed. The edited remnant rectangle continuous line data results in $AP_{31}$, $P_{50}$, $P_{60}$, $AP_{61}$, $P_{70}$, $P_{80}$, $P_{90}$, and $W_2$. Note that the newly generated line segment ($P_{90}$, $W_2$) is a combination of the product line ($P_{80}$, $AP_{91}$) and the cut line ($AP_{91}$, $W_2$), and therefore the "Line Type" is "product".

When dividing every rectangle consecutively, as shown in FIG. 20, a material slug graphic is divided into rectangles. A tool assignment process is performed for each of these divided rectangles.

[Generation of Executable NC Program]

Finally, in the flowchart of FIG. 2, when the tool assignment process is finished for all continuous lines (YES in S286), the tool assignment made through the above described automatic tool assignment is corrected (S111). This correction is carried out using the continuous line file generated in the beginning.

Once a non-executable NC program is generated (S112), the NC program is optimized (S114) and is automatically converted to an executable NC program to be used for actual processing (S116).

The auto-correction and optimization processes written in this NC program can be performed using conventional procedures.

Here, the processing order for extracted rectangles is described. The processing order should generally be consistent with the processing order of all parts in the NC program optimization of FIG. 2 (S114). This processing order may be based on a sophisticated system. The processing order for material slug/remnant rectangles may be a rectangle extracting order, which is based on a processing order allowing completion of each processing by the remnant rectangle unit. However, as an exception, a rectangle with four "cut" line type sides is processed with precedence. However, the overall processing order includes all processing components, and should be optimized within the processing order systems for all the NC programs through an NC program optimization process (S114).

This allows generation of an executable NC program for sheet metal processing from any kind of CAD drawing.

INDUSTRIAL APPLICABILITY

Usage of the sheet metal processing CAD/CAM system according to the present invention allows versatile automatic tool assignment from CAD drawings without dependency on processing shape patterns, which require pre-registering.

The invention claimed is:

1. A computer program product embodied on a computer readable medium containing instructions to perform a method that generates an NC program from a CAD drawing for a sheet metal processing CAD/CAM system, the computer program product comprising:
   division and tool assignment means for searching for the shape of an arc, the shape of an inner processing arc, and the shape of an oblique line from sheet metal processing graphics of a CAD drawing, and converting them to divided processing shapes enclosed by orthogonal lines, which are then defined as material slug shapes;
   rectangular division and tool assignment means for dividing a remnant rectangular shape obtained based on the generated material slug shapes into rectangles and subjecting them to a tool assignment process;
   NC program generation means for generating an NC program from tool assignment data; and
   output means for outputting control commands based on the generated NC program.

2. The computer program product embodied on a computer readable medium of claim 1, further comprising:

priority assignment means for searching for a pre-established priority processing shape from the sheet metal processing graphics of the CAD drawing and precedently assigning a tool to that priority processing shape, wherein the division and tool assignment means processes a graphics that has undergone priority assignment processing.

3. The computer program product embodied on a computer readable medium of claim 1, wherein the output commands of the output means configure the sheet metal processing CAD/CAM system.

4. The computer program product embodied on a computer readable medium of claim 2, wherein the commands output by the output means configure the sheet metal processing CAD/CAM system.

* * * * *